United States Patent
Kralick et al.

(10) Patent No.: US 7,305,865 B2
(45) Date of Patent: Dec. 11, 2007

(54) HYDROCARBON REFORMER PERFORMANCE SENSING SYSTEM

(75) Inventors: James H. Kralick, Albany, NY (US); Norm Peschke, deceased, late of Clifton Park, NY (US); by Sandra H. Peschke, legal representative, Clifton Park, NY (US); Da Yu Wang, Troy, MI (US)

(73) Assignee: Delphi Technologies, Inc., Troy, MI (US)

( * ) Notice: Subject to any disclaimer, the term of this patent is extended or adjusted under 35 U.S.C. 154(b) by 694 days.

(21) Appl. No.: 10/769,164

(22) Filed: Jan. 30, 2004

(65) Prior Publication Data

US 2005/0170226 A1    Aug. 4, 2005

(51) Int. Cl.
   *G01N 33/22*   (2006.01)
   *H01M 8/00*    (2006.01)
(52) U.S. Cl. .......................................... 73/23.2; 429/13
(58) Field of Classification Search ................. 73/23.2; 429/13
   See application file for complete search history.

(56) References Cited

U.S. PATENT DOCUMENTS

| | | | | |
|---|---|---|---|---|
| 3,753,892 A * | 8/1973 | Weith | .......................... | 208/102 |
| 5,677,073 A * | 10/1997 | Kawatsu | ...................... | 429/22 |
| 5,712,052 A * | 1/1998 | Kawatsu | ...................... | 429/13 |
| 5,925,476 A * | 7/1999 | Kawatsu | ...................... | 429/24 |
| 6,083,637 A * | 7/2000 | Walz et al. | ................... | 429/17 |
| 6,165,633 A * | 12/2000 | Negishi | ........................ | 429/17 |
| 6,429,019 B1 * | 8/2002 | Goldstein et al. | ........... | 436/134 |
| 6,528,191 B1 * | 3/2003 | Senner | ......................... | 429/12 |
| 6,555,989 B1 * | 4/2003 | Pearson | ...................... | 320/101 |
| 6,576,359 B2 * | 6/2003 | Fronk | ........................... | 429/13 |
| 6,630,264 B2 * | 10/2003 | Haltiner et al. | ............... | 429/32 |
| 6,692,851 B2 * | 2/2004 | Keskula et al. | ............... | 429/13 |
| 6,740,433 B2 * | 5/2004 | Senner | ......................... | 429/13 |
| 6,847,188 B2 * | 1/2005 | Keskula et al. | ............. | 320/101 |
| 6,884,533 B2 * | 4/2005 | Stocker | ....................... | 429/23 |
| 7,159,444 B2 * | 1/2007 | Demarest et al. | .............. | 73/23.2 |
| 2004/0197718 A1 * | 10/2004 | Deshpande et al. | ............ | 431/2 |
| 2006/0024541 A1 * | 2/2006 | Weiss et al. | .................. | 429/22 |
| 2006/0257302 A1 * | 11/2006 | Deshpande et al. | ......... | 422/198 |

* cited by examiner

*Primary Examiner*—Hezron Williams
*Assistant Examiner*—John Fitzgerald
(74) *Attorney, Agent, or Firm*—Paul L. Marshall

(57) ABSTRACT

In a fuel cell system, a reformer supplies reformate to a fuel cell stack. A portion of the reformate flow is diverted for analysis by a hydrocarbon analysis system. Residual hydrocarbons in the reformate may damage the anodes of the fuel cell stack. Although incompletely-reformed reformate may include a variety of hydrocarbon compounds, the invention simply measures methane as an indicator of the overall performance level of the reformer. A currently preferred embodiment includes a catalytic combustion methane sensor. Combustion air and reformate are delivered in a fixed ratio to the sensor via positive displacement pumps. The system can provide alarm means or optionally a shut-off means to protect a fuel cell stack from elevated levels of hydrocarbons in the reformate stream.

14 Claims, 1 Drawing Sheet

HYDROCARBON REFORMER PERFORMANCE SENSING SYSTEM

TECHNICAL FIELD

The present invention relates to reformers for converting hydrocarbons such as gasoline into hydrogen and other gases; more particularly, to hydrocarbon reformers for supplying gaseous fuels to fuel cells; and most particularly, to a sensing system for monitoring the completeness of hydrocarbon reformation in such a reformer.

BACKGROUND OF THE INVENTION

Fuel cells for catalytically combining elemental hydrogen and oxygen to generate electricity are well known. In so-called proton exchange membrane (PEM) fuel cells, the protons migrate through a membrane and combine with oxygen at a cathode. In so-called solid oxide fuel cells (SOFC), oxygen anions migrate through a solid oxide electrolyte layer and combine with hydrogen at an anode. In both types of fuel cells, gaseous hydrogen is provided to the anode surface. A common means for forming hydrogen in fuel cell systems is through catalytic partial oxidation (known in the art as "reforming") of hydrocarbons such as gasoline via the following non-balanced equation:

$$C_nH_{n+2} + O_2 => H_2 + CO \qquad \text{(Eq. 1)}$$

A PEM fuel cell is intolerant of CO, which can be removed in known fashion. An SOFC can utilize both $H_2$ and CO as fuel sources, being oxidized to $H_2O$ and $CO_2$, respectively.

A potential problem exists is providing hydrogen via a catalytic reformer in line with either type of fuel cell. As a reformer ages in use, the catalyst tends to become less efficient, and the reformate stream may contain a small percentage of non-reformed hydrocarbons. Fuel cell anodes are sensitive to the presence of hydrocarbons, which are readily converted to graphitic carbon, poisoning the catalytic sites of the anode. It can be costly, inconvenient, and time-consuming to replace or regenerate the poisoned anodes in a fuel cell stack.

What is needed in the art is a means for monitoring the gaseous output of a fuel cell reformer to determine when reformer inefficiency becomes a danger to the health of the fuel cell anodes.

It is a principal object of the present invention to prevent significant anode poisoning in a fuel cell system by monitoring and alarming hydrocarbon levels in reformate being provided to the fuel cell system.

SUMMARY OF THE INVENTION

Briefly described, in a fuel cell system wherein a hydrocarbon reformer supplies reformate to a fuel cell stack, a small portion of the reformate flow is diverted for analysis by a hydrocarbon analysis system. An incompletely-reformed reformate may include a variety of hydrocarbon compounds, including methane, in addition to hydrogen and carbon monoxide. However, it is the intent of this invention to measure only the dysfunctional reformer output methane, $CH_4$, as an indicator of the overall performance level of the reformer.

A methane sensor of the invention may be of any known quantitative type, including, but not limited to, catalytic, optical, and solid oxide electrode. A currently preferred embodiment includes a catalytic combustion sensor. Combustion air at ambient pressure is combined with the diverted reformate. Air and reformate are delivered quantitatively in a fixed ratio to the sensor, preferably via a double-headed positive displacement pump. When the fuel cell system is idle, the pumps positively close off flow of any reformate trapped in the lines that would otherwise escape past the sensor and into the environment.

The system provides alarm means to protect a fuel cell stack from elevated levels of hydrocarbons in the reformate stream. Preferably, an alarm is indicated when methane exceeds 1% by volume of the stream, and the reformer and fuel cell are shut down when the methane volume exceeds 3%.

BRIEF DESCRIPTION OF THE DRAWINGS

The present invention will now be described, by way of example, with reference to the accompanying drawing, in which.

DESCRIPTION OF THE PREFERRED EMBODIMENTS

Figure 1:
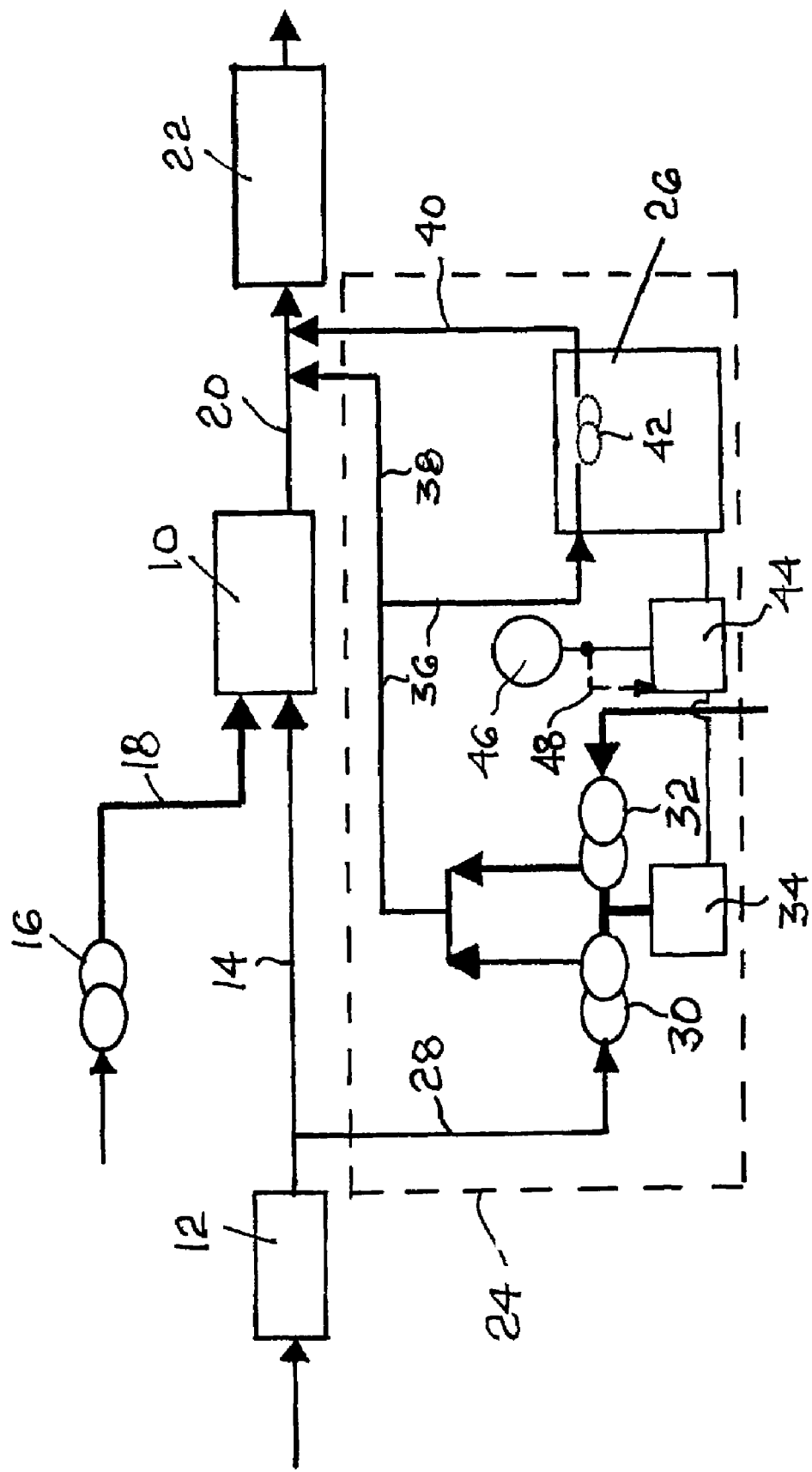
FIG. 1 is a schematic drawing of a reformate methane monitoring and alarming system in accordance with the invention.

Referring to FIG. 1, a conventional fuel cell stack 10 is supplied with reformate from a conventional reformer 12 via line 14. Stack 10 is also supplied with air from a conventional main air blower 16 via line 18. Exhaust products from stack 10 are passed via line 20 through a clean-up exhaust treatment 22 to ensure that the exhaust products are environmentally acceptable. The process and apparatus as described thus far are well known in the prior art.

Attached to the conventional fuel cell system is a system 24 for online monitoring of the methane content of the reformate being generated by reformer 12. A methane monitor 26 is provided; in the presently-preferred embodiment, monitor 26 is a catalytic sensor, for example, Model No. CGI-201, available from Bascom-Turner Instruments, Inc., Norwood, Mass., USA. Of course, other types of methane sensors or monitors are fully comprehended by the scope of the invention.

A catalytic sensor functions by catalytically combusting the methane in the presence of oxygen. Therefore, a combustion mixture having a known ratio of reformate to oxygen must be supplied to the sensor. Line 28 feeds from reformate supply line 14 to provide a slipstream flow of representative reformate to a first positive displacement pump 30. Air is supplied to a second positive displacement pump 32. Preferably, pumps 30,32 are ganged with a common drive 34 as a two-headed pump, such that the proper and fixed ratio of reformate to oxygen is assured by proper sizing of the pumps. Preferably, the air flow is set such that the hydrogen/oxygen lower explosive limit (LEL) of 4% hydrogen is never exceeded. The outputs of pumps 30,32 are joined and supplied to methane monitor 26 via line 36. Excess mixture is sent via line 38 to exhaust treatment 22, as is mixture having passed through monitor 26, via line 40. Monitor 26 includes an internal third positive displacement pump 42 for metering a desired flow of the reformate/oxygen mixture through the monitor sensor for analysis.

Preferably, the drives for pumps 30,32,42, as well as the sensor itself, are controlled conventionally via an Electronic System Controller 44. A monitoring and alarm circuit therein can display continuously the actual methane content of the reformate stream and an annunciator 46 can be set at any desired alarm and action set points in known fashion. Optionally, the monitoring system can be programmed to relay feed back signal 48 to controller 44 so that fuel cell 10 can be shut down or placed in a sub-operating mode such as, for example, by shutting down or placing reformer 12 in a stand-by mode.

The currently-preferred Bascom Turner sensor has the following desirable characteristics. It can detect methane in the reformate of the full range from 0% to 100%. It has a sensitive scale with rapid response. It has automatic zero adjustment and is automatically self-testing. The internal pump drive is intrinsically safe, and the entire unit is rated C1 D1, Groups A, B, C, D.

The dew point of reformate in the slipstream is approximately 100° C., and the maximum temperature of the sample gas for the sensor is above 325° C., so condensation in the apparatus is not a problem. The sensor measures percent methane gas in two ranges: between 0.05% and 4.0% by volume, and between 1% and 100% by volume. The measurement step in both ranges is 0.05%. The electronics for the sensor preferably are housed with the Electronic System Controller in a conditioned space not exceeding 45° C. in temperature.

In an operative example, reformate is provided to sensor 26 via pump 30 at a slipstream flowrate of 0.299 standard liters per minute (slm) and air is provided to sensor 26 via pump 32 at a flowrate of 2.24 slm. The reformate species concentrations and flowrates are:

$N_2$ 60% 0.179 slm
$H_2$ 16% 0.048 slm
CO 16% 0.048 slm
$CO_2$ 6% 0.018 slm
$CH4$ 2% 0.006 slm The theoretical air flow for complete combustion is 1.87 slm. Assuming 20% excess air to keep the mixture below the hydrogen LEL, the actual airflow rate to be mixed with reformate is 2.24 slm.

In this example, the monitoring system is in alarm because the measured methane level is 2%.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A system for monitoring the performance of a hydrocarbon reformer, said reformer producing a reformate output, said system comprising:
   a) a quantitative hydrocarbon sensor; and
   b) a slipstream for providing a sample of the reformate output of said reformer; and
   c) a source of air for combining with said sample of the reformate output to form a mixture, wherein said mixture is provided to said quantitative hydrocarbon sensor for measuring hydrocarbon content of said reformate.

2. A system in accordance with claim 1 wherein said sample providing is continuous.

3. A system in accordance with claim 1 wherein said hydrocarbon is methane.

4. A system in accordance with claim 1 wherein said hydrocarbon sensor is selected from the group consisting of catalytic, optical, and solid oxide electrode.

5. A system in accordance with claim 1 wherein said reformer is a source of gaseous fuel for a fuel cell.

6. A system in accordance with claim 1 further comprising a monitoring system for displaying and alarming the methane content of said reformate sample.

7. A system in accordance with claim 1 wherein said reformer supplies said reformate output to a fuel cell, further comprising a control for shutting down a said fuel cell.

8. A system in accordance with claim 1 further comprising a positive displacement pump for metering a desired flow of said mixture through said quantitative hydrocarbon sensor.

9. A fuel cell system, comprising:
   a) a fuel cell stack;
   b) a hydrocarbon reformer for supplying gaseous fuel in the form of reformate to said stack;
   c) a quantitative hydrocarbon sensor;
   d) a slipstream for providing a sample of said reformate ; and
   e) a source of air for combining with said sample of the reformate output to form a mixture, wherein said mixture is provided to said guantitative hydrocarbon sensor for measuring hydrocarbon content of said reformate.

10. A system in accordance with claim 9 further comprising a positive displacement pump for combining said sample of the reformate with said air, wherein said positive displacement pump positively closes off flow of said sample of the reformate to said quantitative hydrocarbon sensor when said fuel cell is idle.

11. A system for monitoring the performance of a hydrocarbon reformer, said reformer producing a reformate output, said system comprising:
   a) a quantitative hydrocarbon sensor;
   b) a slipstream for providing a sample of said reformate output of said reformer to said sensor;
   c) a source of air for providing air to said sensor; and
   d) a control for combining said air and said reformate sample so that a lower explosive limit of 4 percent hydrogen is not exceeded.

12. A system for monitoring the performance of a hydrocarbon reformer, said reformer producing a reformate output, said system comprising:
   a) a guantitative hydrocarbon sensor;
   b) a slipstream for providing a samle of said reformate output of said reformer to said sensor;
   c) a source of air for providing air to said sensor; and
   d) a control for combining said air and said reformate sample in a fixed and predetermined ratio.

13. A system in accordance with claim 12 wherein said control for combining includes at least one positive displacement pump.

14. A system in accordance with claim 12 wherein said control for combining includes a double-headed positive displacement pump.

* * * * *